Dec. 12, 1950        A. I. ROMAN        2,534,062
AIRCRAFT WITH RETRACTABLE ROTARY WINGS
Original Filed July 26, 1944        2 Sheets—Sheet 1

INVENTOR.
Alfred I. Roman
BY
ATTORNEY

Dec. 12, 1950  A. I. ROMAN  2,534,062
AIRCRAFT WITH RETRACTABLE ROTARY WINGS
Original Filed July 26, 1944  2 Sheets-Sheet 2
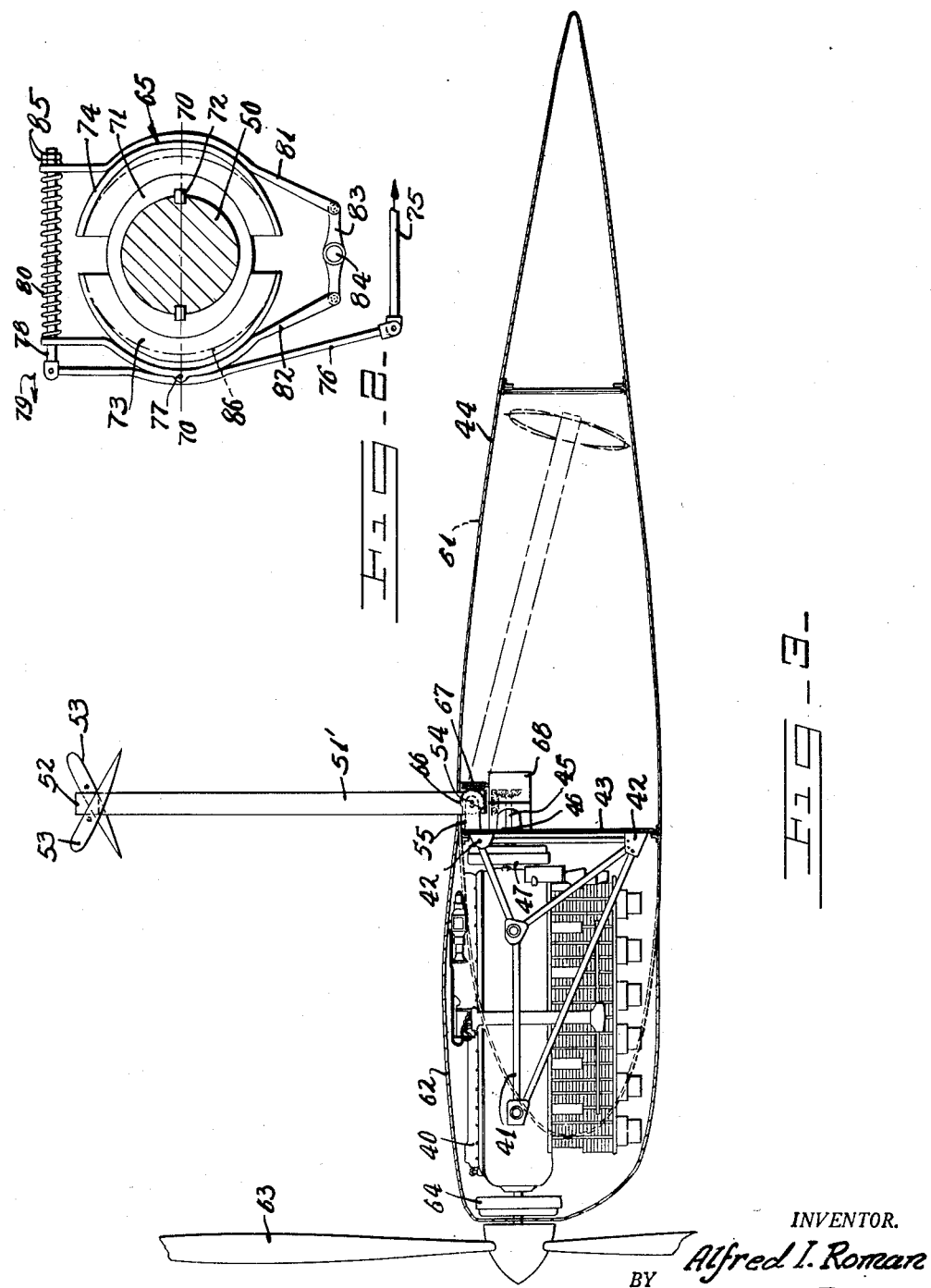
INVENTOR.
Alfred I. Roman
BY
Zoltan Holbek
ATTORNEY Patented Dec. 12, 1950

2,534,062

UNITED STATES PATENT OFFICE 2,534,062

AIRCRAFT WITH RETRACTABLE ROTARY WINGS

Alfred I. Roman, New York, N. Y.

Substituted for abandoned application Serial No. 546,661, July 26, 1944. This application February 20, 1948, Serial No. 9,881

10 Claims. (Cl. 244—6)

1

This invention relates to new and useful improvements in aircraft with retractable rotary wings. This is a substitute for my abandoned application filed on July 26, 1944, Serial Number 546,661.

More particularly, the invention proposes a new and improved airplane characterized by fixed wings, and a rotative wing or wings mounted on said fixed wings. It is proposed to provide a means for driving said rotative wing or wings. It is furthermore proposed to provide means for extending and retracting said rotative wings into said fixed wings.

The dominating advantage of an improved airplane in accordance with this invention resides in the fact that during take off and landing, and whenever it is necessary, it is possible to extend the rotating wing or wings into an operating position or positions for increasing the lift of the aircraft so that it may take off and land on comparatively small fields. During flight it is proposed that the rotative wing or wings be retracted into the stationary wing or wings, eliminating the drag of the rotating wings and permitting greater forward speed.

The invention proposes embodying the dominating features therein in numerous design and constructions. For example, it is proposed to extend or retract the rotative wing or wings mechanically, electrically, hydraulically, etc.

It is also proposed to arrange the rotating wing or wings in various ways and drive them with individual engines or from one or a number of engines, as desired.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 2 is an enlarged horizontal detail view of the brake mechanism.

Fig. 3 is another sectional view of the wing of an airplane constructed according to a modification of the present invention.

Figure 1:
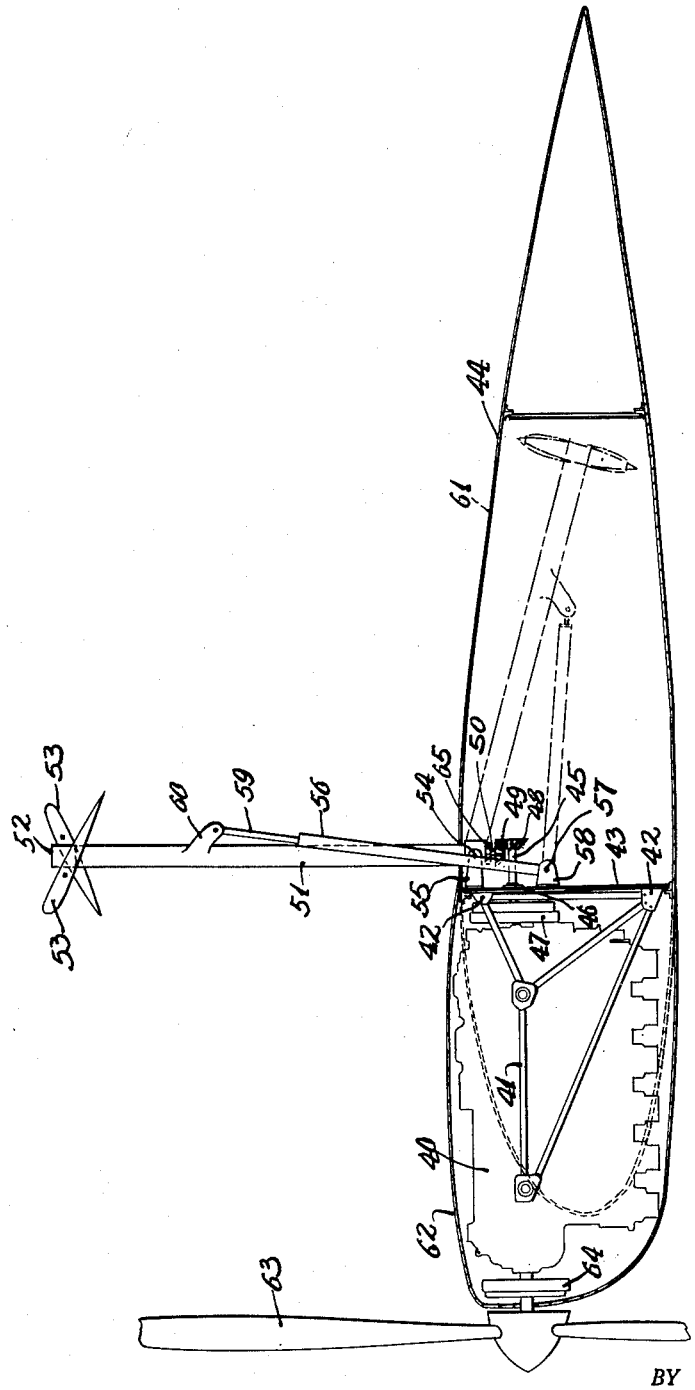
Fig. 1 is a sectional view of the wing of an airplane constructed in accordance with the present invention.

The aircraft with retractable rotary wings, according to the first form of the invention shown in Figs. 1 and 2 includes a power plant 40 supported by tubular members 41 upon brackets 42 mounted on the front spar 43 of a wing section 44 of an airplane. The power plant 40 drives a shaft 45 rotatively supported in a bearing 46 mounted on the front spar 43.

A power plant nacelle 62 is mounted on the leading edge of the wing section 44. The power plant 40 drives a propeller 63 through the medium of a clutch 64.

The shaft 45 is provided with a clutch 47 by which the power plant 40 may be disconnected from it when desired. A gear 48 is mounted on the shaft 45 and meshes with a gear 49 mounted on a shaft 50 rotatively mounted through a tubular housing 51 and terminating in a propeller hub 52 on the outer extremity of the housing 51. This propeller hub 52 is provided with the usual rotary wings 53 for helicopter flight. The shaft 50 is provided with a brake 65 by which the rotary wings 53 may be stopped in a transverse position so as to be capable of retraction into the opening 61 of the wing section 44. The brake 65 is mounted on the lower end of the housing 51 to act upon the projected bottom end of the shaft 50 to which the bevel gear 49 is attached.

The housing 51 is pivotally supported by a trunnion 54 on a bracket 55 mounted on the front spar 53. An air or hydraulic cylinder 56 is pivotally mounted by a pintle 57 to a bracket 58 also mounted on the front spar 43. A piston rod 59 extends from the cylinder 56 and connects with a lug 60 formed on the housing 51. The wing section 44 is provided with a top opening 61 through which the housing 51 and the rotary wings 53 may be retracted into the wing section 44, as indicated by the dot and dash lines.

In Fig. 2, the brake mechanism 65 is shown with the drive shaft 50 which will be brought slowly to a complete stop with its major diameter indicated by 70—70 turned 90 degrees.

The drive shaft 50 is keyed to the cam 71 by means of keys 72 so as to rotate with it. A rubber cam 73 is fused or vulcanized to the cam 71 and is covered with asbestos or other heat-resisting material band 74.

When link 75 is pulled in the direction of the arrow, at the bottom of Fig. 2, it moves a lever 76 which is pivoted at 77 and the rod 78 will be pulled in the direction of the arrow 79, thereby compressing the spring 80 which holds the brake shoes 81 and 82 apart. The brake shoes 81 and 82 are joined to link 83, pivoted at 84 to the bottom end of the housing 51. The rod 78 is secured by lock-nuts 85. When the shoes 81 and 82 are forced together, they slow down the rotation of the shaft until the band 74 assumes the shape indicated by the dot and dash lines 86. The rubber 73 is fully compressed and the shaft is completely stopped.

The operation of this form of the invention is as follows:

A plane equipped as described in Fig. 1 is ready to ascend when the clutch 64 is disengaged and the clutch 47 is engaged. The power plant 40 then drives the rotary wings 53 for developing the necessary helicopter lift. After a suitable altitude is obtained the power plant 40 is connected up to drive the propeller 63 by closing the clutch 64. Now the clutch 47 may be opened and the brake 65 applied so as to stop the rotary wings 53 when they are parallel with the opening 61 of the wing section 44. The air or hydraulic cylinder 56 and piston 59 are then operated so as to retract the housing 51 within the wing section to the position illustrated by the dot and dash lines.

In Fig. 3, a modification of the present invention has been disclosed which is very similar to the prior form, distinguishing merely in the mechanism by which the housing for the drive shaft of the rotary wings 53 is raised and lowered. More specifically, the rotary wings 53 are located on the end of the housing 51' which encloses the drive shaft 50 for the rotary wings, as explained in the prior form of the invention. The trunnion 54 which pivotally supports the housing 51 is provided with a worm wheel 66 engaged by a worm 67 driven by an electric motor 68.

The operation of this form of the invention is identical to the prior form distinguishing merely in the fact that the housing 51' is extended and retracted by operating the electric motor 68 to rotate in one direction or the other so that the worm 67 drives the gear 66 to turn the trunnion 54 as required. In other respects this form of the invention is similar to that described in connection with Figs. 1 and 2, and like reference numerals identify like parts in all of the views.

It is to be understood that the rotative wing or wings may be extended or retracted mechanically, electrically by the use of a suitable electric motor or by a suitable pneumatic or hydraulic arrangement.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an airplane, a wing section having an opening formed therein, a front spar in said wing section, a power plant mounted upon said front spar, a propeller shaft rotatively mounted through said front spar and connected via a clutch with said power plant, a tubular housing, a shaft rotatively mounted through said housing, rotary wings mounted upon the outer end of said last-named shaft, a transmission arranged to provide a releasable connection between said shafts, a bracket mounted on said front spar and pivotally supporting said housing, and means for pivoting said housing from a vertical position through the opening to housed position in said wing section.

2. In an airplane, a wing section having an opening formed therein, a front spar in said wing section, a power plant, a propeller shaft connected via a clutch with said power plant, a tubular housing, a shaft rotatively mounted through said housing, rotary wings mounted upon the outer end of said last-named shaft, a transmission arranged to provide a releasable connection between said shafts, a bracket mounted on said front spar and pivotally supporting said housing, and means for pivoting said housing from a vertical position through the opening to a housed position in said wing section, said means including a pivotally mounted cylinder and piston rod connected between said front spar and said housing.

3. In an airplane, a wing section having an opening formed therein, a front spar in said wing section, a power plant, a shaft connected via a clutch with said power plant, a tubular housing, a shaft rotatively mounted through said housing, rotary wings mounted upon a hub on the outer end of said last-named shaft, a transmission arranged to provide a releasable connection between said shafts, a bracket mounted on said front spar and pivotally supporting said housing, and means for pivoting said housing from a vertical position through the opening to a housed position in said wing section, comprising a gear connected with the pivot of said housing, a worm meshing with said gear, and an electric motor for driving said worm in one direction or the other.

4. In an airplane, a wing section having an opening formed therein, a front spar in said wing section, a power plant, a shaft connected via a clutch with said power plant, a tubular housing, a shaft rotatively mounted through said housing, rotary wings mounted upon a hub on the outer end of said last-named shaft, a transmission arranged to provide a releasable connection between said shafts, a bracket mounted on said front spar and pivotally supporting said housing, and means for pivoting said housing from a vertical position through the opening to a housed position in said wing section, and hydraulic means for extending or retracting said rotary wings.

5. In an airplane, a fixed wing having an opening formed therein, a front spar in said wing, a powerplant mounted upon said front spar, a drive shaft rotatively mounted through said front spar and connected through a clutch with said powerplant, a tubular housing, a shaft rotatively mounted through said housing and geared to said drive shaft, a bracket mounted on said front spar and pivotally supporting said housing, a hub attached to the outer end of said shaft through said housing, rotary wings mounted on said hub, means for braking said rotary wings and for holding them in a position aligned with said wing opening, said means being mounted upon the end of said housing nearest the supporting bracket, and means for retracting said housing from a position extending through said wing opening to a position within said wing, or for extending said housing from its retracted position.

6. In an airplane, a fixed wing having an opening formed therein, a front spar in said wing, a powerplant mounted upon said front spar, a drive shaft rotatively mounted through said front spar and connected through a clutch with said powerplant, a tubular housing, a shaft rotatively mounted through said housing and geared to said drive shaft, a bracket mounted on said front spar and pivotally supporting said housing, a hub attached to the outer end of said shaft through said housing, rotary wings mounted on said hub, means for braking said rotary wings and for holding them in a position aligned with said wing opening, said means being mounted upon the end of said housing nearest the supporting bracket, and means for retracting said housing from a position extending through said wing opening to a position within said wing, or for extending said housing from its retracted position, said means including a pivotally mounted cylinder and piston rod connected between said front spar and housing.

7. In an airplane, a fixed wing having an opening formed therein, a front spar in said wing, a powerplant mounted upon said spar, a drive shaft rotatively mounted through said front spar and connected through a clutch with said powerplant, a tubular housing, a shaft rotatively mounted through said housing and geared to said drive shaft, a bracket mounted on said front spar and pivotally supporting said housing, a hub attached to the outer end of said shaft through said housing, rotary wings mounted on said hub, means for braking said rotary wings and for holding them in a position aligned with said wing opening, said means being mounted upon the end of said housing nearest the supporting bracket, and means for retracting said housing from a position extending through said wing opening to a position within said wing, or for extending said housing from its retracted position.

8. In an airplane, a fixed wing having an opening formed therein, a front spar in said wing, a powerplant mounted upon said front spar, a drive shaft rotatively mounted through said front spar and connected through a clutch with said powerplant, a tubular housing, a shaft rotatively mounted through said housing and geared to said drive shaft, a bracket mounted on said front spar and pivotally supporting said housing, a hub attached to the outer end of said shaft through said housing, rotary wings mounted on said hub, means for braking said rotary wings and for holding them in a position aligned with said wing opening, said means being mounted upon the end of said housing nearest the supporting bracket, and hydraulic means for retracting said housing from a position extending through said wing opening to a position within said wing, or for extending said housing from its retracted position.

9. In an airplane, a wing section having an opening, a front spar in said wing section, a powerplant mounted upon said front spar, a propeller shaft rotatively mounted through said front spar and connected via a clutch with said powerplant, a tubular housing, a shaft rotatively mounted through said housing, rotary wings mounted upon the outer end of said shaft, a transmission connecting said shafts, a bracket pivotally supporting said housing, and means for pivoting said housing from a vertical position to a position extended through the opening in said wing section into the wing section, comprising a gear mounted on the pivot shaft of said housing, a worm meshing with said gear, and a reversible electric motor for driving said worm in one direction or the other.

10. In an airplane, a wing section having an opening, a front spar in said wing section, a powerplant mounted upon said front spar and having a projected drive shaft, a tubular housing, a shaft rotatively mounted through said housing, rotary wings mounted upon the outer end of said housing shaft, gears connecting said drive shaft and housing shaft, a bracket pivotally supporting said housing, and means for pivoting said housing from a vertical position to a position extended through the opening in said wing section into the wing section, to extend and retract said rotary wings.

ALFRED I. ROMAN.

REFERENCES CITED

The following references are of record in the file of this patent:

UNITED STATES PATENTS

| Number | Name | Date |
|---|---|---|
| 1,485,704 | Pescara | Mar. 4, 1924 |
| 1,704,753 | Many | Mar. 12, 1929 |
| 1,755,058 | Finley | Apr. 15, 1930 |
| 1,763,819 | Reed | June 17, 1930 |
| 2,008,843 | Smith | July 23, 1935 |
| 2,052,086 | Dornier | Aug. 25, 1936 |
| 2,094,105 | Myers | Sept. 28, 1937 |

FOREIGN PATENTS

| Number | Country | Date |
|---|---|---|
| 472,127 | France | July 27, 1914 |